July 1, 1924.

P. E. BRENEMAN 1,499,339

DETACHABLE UPHOLSTERY FOR METALLIC BODIES OF VEHICLES

Original Filed June 19, 1920

Inventor
Paul E. Breneman

By Whittemore Hulbert & Whittemore

Attorneys

Patented July 1, 1924.

1,499,339

UNITED STATES PATENT OFFICE.

PAUL E. BRENEMAN, OF PHILADELPHIA, PENNSYLVANIA, ASSIGNOR TO C. R. WILSON BODY COMPANY, OF DETROIT, MICHIGAN, A CORPORATION OF MICHIGAN.

DETACHABLE UPHOLSTERY FOR METALLIC BODIES OF VEHICLES.

Application filed June 19, 1920, Serial No. 390,069. Renewed December 12, 1923.

*To all whom it may concern:*

Be it known that I, PAUL E. BRENEMAN, a citizen of the United States of America, residing at city of Philadelphia, in the county of Philadelphia and State of Pennsylvania, have invented certain new and useful Improvements in Detachable Upholstery for Metallic Bodies of Vehicles, of which the following is a specification, reference being had therein to the accompanying drawings.

The invention relates to upholstery for metallic vehicle bodies and has particular reference to the construction of means for engaging and retaining detachable upholstery units. To this end the invention consists in the construction as hereinafter set forth.

Figure 1:
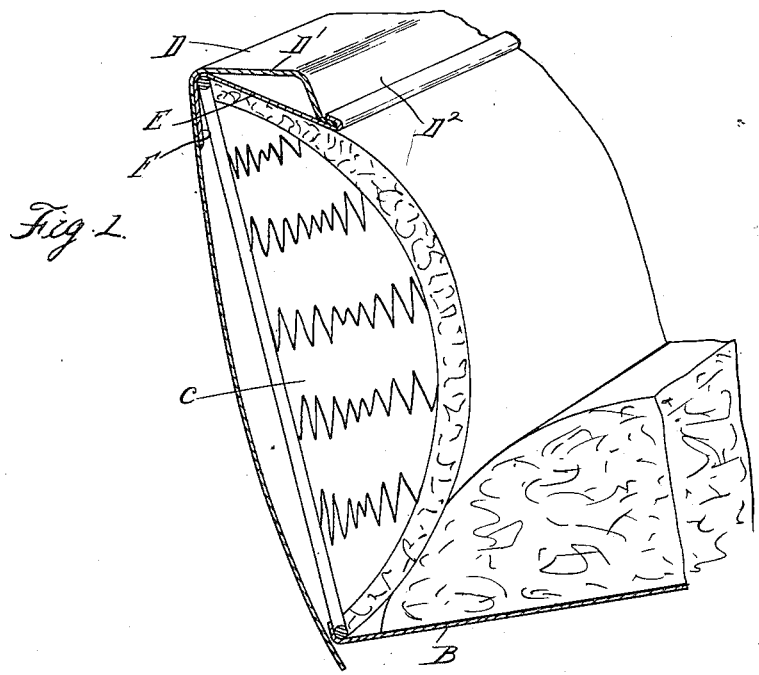
Figure 1 is a sectional perspective view.
Figure 2:
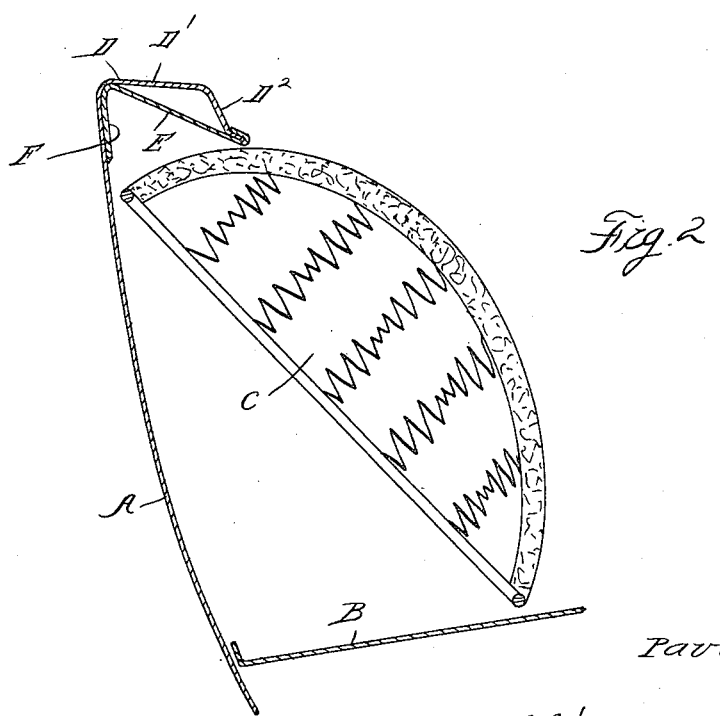
Figure 2 is a section showing the manner of engaging the unit.

A is the metallic sheet forming the outer panel of a portion of a vehicle body, such, for instance, as a seat back. B is a seat-supporting frame, and C is an upholstery unit for attachment to the body, which as specifically shown forms the cushion for the seat back.

To detachably secure the upholstery unit in position, the outer panel A is provided with a flange D forming a border rail and which may be fashioned into any desired contour. As shown, the flange D has a portion D' extending at substantially right angles to the adjacent portion of the sheet A and an inturned portion D² connected to the portion D' by a rounded bend. To the outer edge of the portion D² there is secured a member E, which is seamed thereto and which extends obliquely to the bend between the panel A and portion D'. The member E is further provided with a down-turned flange F, which may be spot-welded or otherwise secured to the adjacent face of the panel A.

With the construction as described the member E extends in acute angular relation to the member A and thus forms an under-cut channel. The upholstery unit C has a border portion engaging this under-cut channel and the form of the unit is such that the portion engaging said channel, as well as the portion extending outward therefrom, will lie parallel to the member E when the unit is in place. This will avoid any cutting or marring of the facing of the unit by the edge of the rail, while at the same time said rail may be of any contour desired and one which differs from that of the member E. The unit C, which is of any suitable construction, may be attached to the body by first engaging its outer edge with the rail and then moving its opposite edge inward or towards the panel A along the seat-supporting frame B.

What I claim as my invention is:

1. The combination with a vehicle body, of a turned flange forming a border rail of a desired contour with a channel on its inner face, an upholstery unit having a portion extending within said channel, and a member of angular cross section secured to said flange extending parallel to the facing of said upholstery unit to form a retaining seat therefor.

2. The combination with a vehicle body, of a turned flange forming a border rail of desired contour and providing a channel on its inner face, an upholstery unit having a marginal portion engaging the channel of said rail, and a member seamed to the outer edge of said flange extending in a direction parallel to the face of said upholstery unit and forming a seat for the border portion thereof.

3. The combination with a vehicle body, of a flange integral with said body forming a border rail therefor of a desired contour, a member seamed to the outer edge of said flange and extending into said body forming an acute angular relation therewith, and an upholstery unit having a portion for engaging the acute angle formed by said last-mentioned member, the facing of said unit lying parallel to said member when in contact therewith and extending outward therefrom.

In testimony whereof I affix my signature.

PAUL E. BRENEMAN.